Jan. 17, 1939. A. VANG 2,143,964
AUTOMOBILE HEATER
Filed Aug. 20, 1936
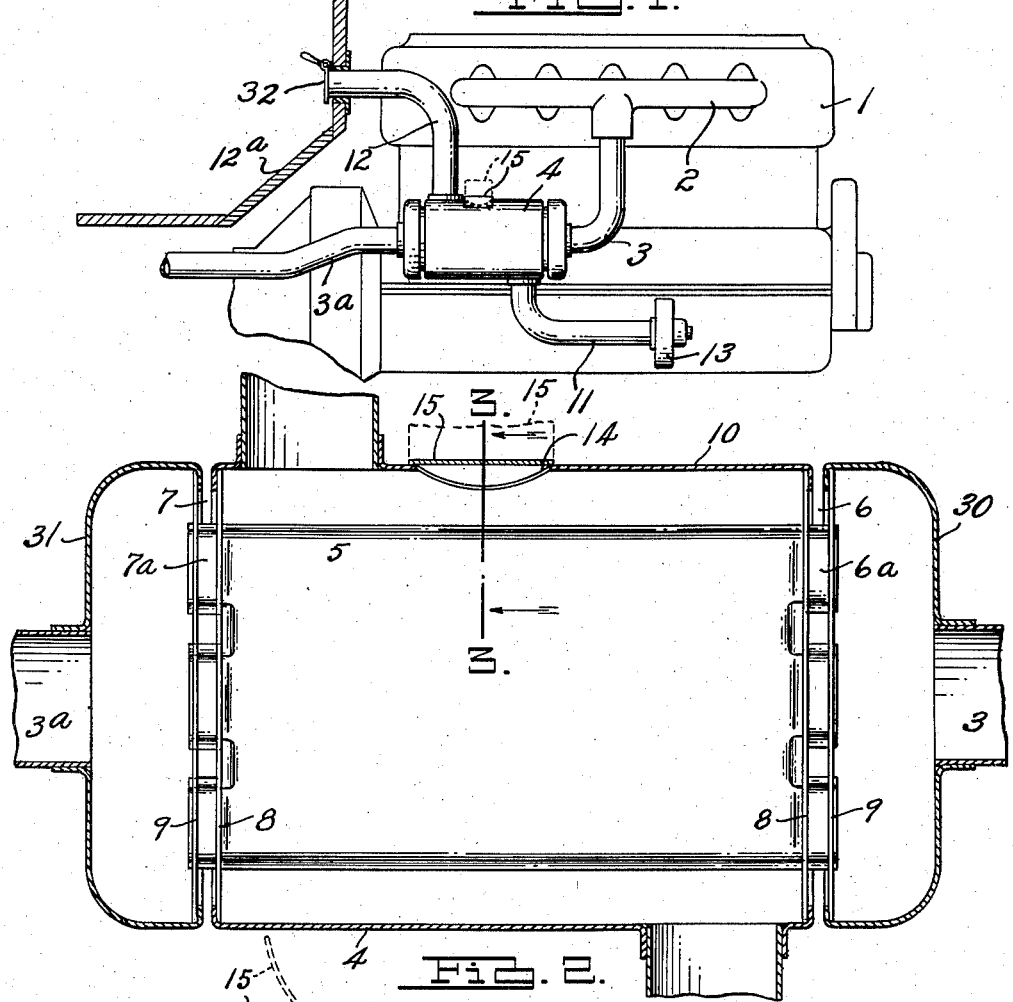
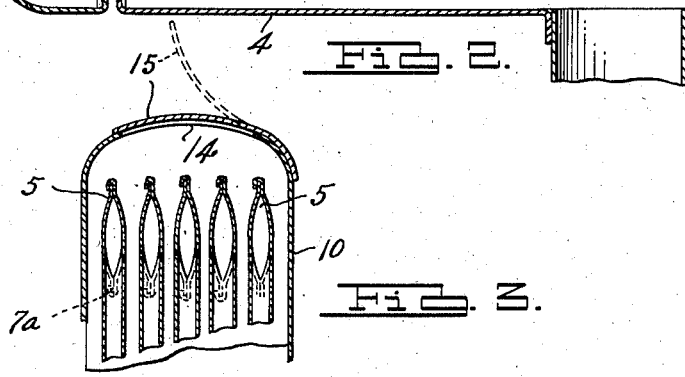
INVENTOR.
Alfred Vang
BY
ATTORNEY.

Patented Jan. 17, 1939

2,143,964

UNITED STATES PATENT OFFICE 2,143,964

AUTOMOBILE HEATER

Alfred Vang, Detroit, Mich.

Application August 20, 1936, Serial No. 97,032

5 Claims. (Cl. 237—12.3)

This invention relates to automobile heaters, the object being to provide a heater for automobiles in which the volume of air discharged to the compartment being heated may be varied in volume depending upon its temperature.

It is further an object and feature of the invention to provide a heater for the purpose described in which the air discharged through the heater to the compartment to be heated is controlled in volume through use of a thermostatic element affected by the temperature of the heater and functioning to discharge a portion of the air passing through the heater to atmosphere when a certain high temperature of the heater is attained and to pass all the air discharged through the heater into the compartment to be heated at certain low heater temperature.

Heretofore, in hot air heaters for automobiles, it is usual to discharge air from atmosphere through the heater element into the body of the vehicle. However, when an automobile is driven for long periods of time or at a high rate of speed, the heater itself becomes very hot and the volume of air discharged at high temperature becomes uncomfortable to the occupants of the vehicle. Furthermore, such high heat is destructive of the heater structure for which reason heaters of this character heretofore have been made of comparatively heavy metal to resist corrosion due to the volume of the air handled and the heat applied thereto.

By my improved hot air heater for automotive vehicles, I am able to automatically maintain a proper temperature within the compartment being heated by reducing the volume of air discharged to the automotive vehicle when at certain high temperature although full volume of air is being discharged into the heater, a portion of which is discharged to atmosphere and increasing the volume of air discharge to the compartment when at lower temperature. By this large volume of air being constantly passed through the heater, its temperature is lessened which otherwise would be high, especially at high engine speeds or long continued engine operation.

The principal feature of the invention resides in the provision of the usual air conduit through which air may be discharged through the heater to the compartment being heated and associated with which is a temperature responsive valve plate for opening or closing a passageway for air from the heater to atmosphere, the said valve functioning to close the passageway or aperture to atmosphere under low heater temperature and to open at high heater temperature.

These and other objects and various novel features of the invention are hereinafter more fully described and claimed, and a convenient form of hot air heater embodying my invention is shown in the accompanying drawing in which—

Fig. 1 is a fragmentary view of an automobile engine showing a wall of a compartment to be heated in association with which is shown my improved heater in elevation.

Fig. 2 is an enlarged longitudinal section of the heater element.

Fig. 3 is a cross section of the heater taken on line 3—3 of Fig. 2.

In Fig. 1 is shown a conventional internal combustion engine 1 having an exhaust manifold 2 and an exhaust conduit 3 in which is positioned my improved heater 4, the exhaust conduit 3 opening at one end to the heater and a companion portion 3a of the exhaust conduit extending from the opposite end thereof leading to the usual muffler (not here shown).

The heater in the construction here shown consists of a series of sheet metal tubes 5, 5, etc. These tubes are wide having substantially parallel walls and open through headers 6 and 7 at the respective opposite ends by a series of extensions 6a and 7a. These headers are each provided with spaced flanges 8 and 9 and a shell 10 has its end wall inturned over the flanges 8 of the two headers at opposite ends and forming a chamber which has an inlet from atmosphere at 11 and an outlet at 12 on the opposite side in the arrangement here shown.

Air may be discharged through this chamber in any approved manner as by means of a fan indicated diagrammatically at 13 in Fig. 1. The fan, however, may be otherwise positioned as, for instance and not by way of limitation, at the discharge end of the outlet 12 rather than at the inlet end of the conduit portion 11 or the engine fan may be utilized for this purpose as is a common practice. The air, in passing from the inlet conduit 11 to the discharge conduit 12, passes about the exhaust gas tubes opening through the headers 6 and 7 and for the purpose of directing exhaust gases through the tubes 5, the outer flange 9 of each header has secured thereto a correspondingly flanged conduit element 3 at the inlet end and 3a at the outlet end corresponding to the same conduit portions shown at 3 and 3a in Fig. 1. The exhaust gases from the engine pass from the manifold 3 through the conduit 3 directly through the tubular elements 5 in the air chamber formed by the casing 10 and thence through the portion 3a of the exhaust manifold. These tubes therefore become heated by the exhaust gases and the air passing about the tubes becomes heated.

For the purpose of regulating the temperature of the air as well as the volume of air discharged to the compartment 12a of the automobile to which the air discharge conduit 12 communicates as shown in Fig. 1, I provide an opening 14 in the upper side of the casing 10 preferably adjacent the outlet 12 and within the interior of the casing I provide a thermostatic blade 15 formed of bimetal, both sides of which preferably are formed of nickel alloy to prevent deterioration through heat.

The blade, when in a heated condition, occupies the position shown in dotted lines in Fig. 3—that is, curved outwardly away from the opening 14 thereby permitting the air, if blown through the conduit 11, to discharge partly through the aperture 14 and partly through the conduit 12. When in the unheated condition, the blade, as shown in full lines in Fig. 3, closes the opening 14 to material flow of air therethrough. Therefore, by the arrangement described, the volume of air discharged through the conduit 12 is controlled by reason of the temperature of the atmosphere within the casing 10 and consequently the temperature of the compartment of the automobile being heated is controlled as less air when at certain high temperature, will be discharged to the compartment per unit of time. With such an arrangement of parts, the compartment does not become overheated when the engine is operated at high speed or otherwise becomes highly heated. The volume of air discharged through the heater, however, has not been changed and therefore heat is rapidly taken away from the heater. Thus overheating of the elements of the heater is avoided enabling the same to be made of thinner metal and materially less weight as deterioration from overheating is prevented. The thin metal also provides for rapid transfer of heat to the air stream. By this construction therefore the initial cost of the heater is reduced as considerable of the metal, if not all, of which the heater is composed is usually of chrome nickel or similar comparatively expensive metal, and further a much more satisfactory operation of the heater is secured and the vehicle compartment does not become uncomfortably heated.

As here shown, only one structural form of an air heater is shown but it is to be pointed out that other specific structural forms of heater may be utilized, the essential characteristic being in the provision of an air chamber through which air is passed to the vehicle and heated by means of the exhaust gases of the automobile engine and in association with which is provided a means controlled by the temperature of the air in the air chamber for diverting a greater or less portion of the air to atmosphere and the remaining portion only being discharged into the compartment being heated.

It is to be noted that the inlet portion 3 of the exhaust conduit and the outlet portion 3a thereof are connected with the ends of the heater by means of a flanged casing 30 and 31 at the respective opposite ends providing a chamber enclosing the open ends of the tubes 5 so that all of the tubes are alike provided with the heated exhaust gases.

Also I preferably provide a valve plate 32 at the outlet end of the air conduit 12 discharging into the compartment 12a. This valve plate may be of any approved construction enabling the occupants of the vehicle to vary the air flow if desired, or to close the same entirely as in such case the air discharged by the blower will pass through the aperture 14 to atmosphere.

The construction therefore provides for a continuous flow of air through the heater carrying the heat away therefrom, either to the compartment or to atmosphere or partially to atmosphere and partially to the compartment, depending upon whether the valve is fully or partially closed. Thus, by my construction, I have provided a heater that does not require to be dismantled during the summer period as is usually the requirement with a hot air heater.

Having thus fully described my invention, its utility and mode of operation, what I claim and desire to secure by Letters Patent of the United States is—

1. In a heater for an internal combustion engine driven automotive vehicle having a compartment to be heated, a body having an air chamber in which the air is subjected to change in temperature by the passage of exhaust gases through the heater, said chamber having an inlet for air and an outlet conduit leading to the said compartment and an outlet to atmosphere, means for supplying air to the air chamber substantially constant in volume per unit of time, and means including a temperature responsive device subject to influence of the air within the air chamber for closing the outlet to atmosphere at certain low temperature and at certain higher temperature opening the outlet to permit discharge of a portion of the air flowing to the chamber, said portion increasing or decreasing in volume through increase or decrease respectively in temperature in the air chamber above the temperature at which the outlet to atmosphere is closed.

2. A heater for an internal combustion driven vehicle comprising a body arranged to be heated by a passage of exhaust gases therethrough, said body having an air chamber provided with an outlet to atmosphere, means associated therewith for causing a flow of air through the heater to the air chamber to be heated by the exhaust gases and discharged to the compartment of a vehicle, and means including a temperature responsive device for varying the volume of flow of air through the outlet to atmosphere to thereby vary the volume of air discharged to the compartment, said means being controlled by the temperature of the air in the air chamber to increase or decrease the flow of air through the outlet to atmosphere as the temperature of the air in the air chamber respectively decreases or increases.

3. A heater of the character described comprising a body having elements through which heated gases may be passed, a casing about the body and said elements providing an air chamber, an inlet for air thereinto and an outlet for air therefrom, said casing having an opening leading to atmosphere, and a thermostatic element supported by the heater in position to normally close the opening to atmosphere at certain low temperature of the air in the air chamber and to open the same to atmosphere at certain higher temperature to thereby pass a portion of the air flowing into the casing directly to atmosphere and a portion only thereof to the outlet conduit.

4. A heater for internal combustion engine driven vehicles having a compartment to be heated comprising a body having conduits through which the exhaust gases from the engine pass, a casing enclosing the said conduits and providing an air chamber, said chamber having an outlet conduit discharging to the compartment to be heated and an inlet conduit, means for causing a flow of air through the inlet conduit and casing, said casing having an opening to atmosphere adjacent the connection of the outlet conduit thereto, and a bimetallic blade supported adjacent the opening and functioning to close the opening through influence of certain low temperature in the air chamber and to open the same to an increasing or decreasing degree as the temperature in the air chamber above a certain low temperature increases and decreases in temperature.

5. In a heater for combustion driven automotive vehicles, a heater element through which the exhaust gases from the engine may pass, said heater element having an air chamber in which the air is heated by the passage of gases through the heater, said chamber having an inlet for air and an outlet for air leading to the compartment of the vehicle to be heated, means providing for a supply of air to the inlet substantially constant in volume per unit of time and temperature controlled means responsive to the air temperature in the air chamber for decreasing the volume of air discharged per unit of time through the outlet on increase in the temperature of the air in the air chamber.

ALFRED VANG.